US009423658B2

(12) United States Patent
Wang et al.

(10) Patent No.: US 9,423,658 B2
(45) Date of Patent: Aug. 23, 2016

(54) LIQUID CRYSTAL DISPLAY PANEL, DISPLAY DEVICE AND ELECTRIC APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Yongcan Wang, Beijing (CN); Hongming Zhan, Beijing (CN); Lifeng Lin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 14/355,266

(22) PCT Filed: Oct. 17, 2013

(86) PCT No.: PCT/CN2013/085361
§ 371 (c)(1),
(2) Date: Apr. 30, 2014

(87) PCT Pub. No.: WO2014/176871
PCT Pub. Date: Nov. 6, 2014

(65) Prior Publication Data
US 2014/0347616 A1 Nov. 27, 2014

(30) Foreign Application Priority Data

Apr. 28, 2013 (CN) .......................... 2013 1 0155791

(51) Int. Cl.
G02F 1/1343 (2006.01)
G02F 1/1339 (2006.01)

(52) U.S. Cl.
CPC ...... *G02F 1/134363* (2013.01); *G02F 1/13392* (2013.01); *G02F 1/13394* (2013.01); *G02F 1/134309* (2013.01); *G02F 2001/134372* (2013.01)

(58) Field of Classification Search
CPC .................... G02F 1/134363; G02F 1/133707; G02F 1/134336; G02F 1/13392; G02F 1/13394
See application file for complete search history.

(56) References Cited

U.S. PATENT DOCUMENTS 6,657,766 B2 * 12/2003 Minoura ........... G02F 1/133553
349/80
6,704,084 B2 * 3/2004 Kodate et al. .................. 349/141
(Continued)

FOREIGN PATENT DOCUMENTS

| CN | 101004526 A | 7/2007 |
| CN | 101995707 A | 3/2011 |
| CN | 103018976 A | 4/2013 |

OTHER PUBLICATIONS

Written Opinion of the International Searching Authority dated Jan. 16, 2014; PCT/CN2013/085361.

*Primary Examiner* — Dung Nguyen
(74) *Attorney, Agent, or Firm* — Ladas & Parry LLP

(57) ABSTRACT

A liquid crystal display panel, a display device and an electric apparatus are disclosed. The liquid crystal display panel including a color filter substrate and an array substrate; pixel electrodes, common electrodes and an insulator layer that separates the pixel electrodes and the common electrodes are provided on the array substrate; a plurality of first protruding structures in an upward protruding direction and a plurality of second protruding structures in a downward protruding direction are provided inside the insulator layer; the first protruding structures and the second protruding structures are disposed alternately, the pixel electrode and the common electrode are respectively formed on the first protruding structures and the second protruding structures. The pixel electrodes and the common electrodes are formed on the protruding structures that are disposed alternately, so that the transmittance of the liquid crystal display panel is increased, and picture display quality of the liquid crystal display panel is improved.

18 Claims, 3 Drawing Sheets

(56) References Cited

U.S. PATENT DOCUMENTS

| | | |
|---|---|---|
| 2009/0284707 A1 | 11/2009 | Cho et al. |
| 2011/0249229 A1 | 10/2011 | Kubota et al. |
| 2012/0327350 A1 * | 12/2012 | Chang et al. .................. 349/139 |

\* cited by examiner ure work efficiency has
LIQUID CRYSTAL DISPLAY PANEL, DISPLAY DEVICE AND ELECTRIC APPARATUS

TECHNICAL FIELD

Embodiments of the present invention relate to a liquid crystal display panel, a display device and an electric apparatus.

BACKGROUND

At present, liquid crystal display panels, according to a display mode, can be classified into: TN (Twisted Nematic) type, IPS (In-Plane Switching) type, ADS (AdvancedSuper Dimension Switch) type, and so on.

In a liquid crystal display panel of an ADS display mode, a multidimensional electric field is formed mainly by an electric field generated by edges of slit electrodes in the same plane and an electric field generated between a slit electrode layer and a plate-like electrode layer, so that liquid crystal molecules at all alignments and are provided between the slit electrodes in a liquid crystal cell and right above the electrodes can be rotated. Therefore, work efficiency of the liquid crystal has been improved and light transmittance has been increased.

A pixel structure of a conventional ADS display mode is illustrated in FIG. 1, when the pixel is driven normally, an electric field is formed by a voltage difference between a pixel electrode 4 and a common electrode 6, so that movements of liquid crystal molecules are effectively controlled, and then display of black and white as well as gray level are realized.

FIG. 3 is a diagram schematically illustrating the transmittance of a pixel structure of the conventional ADS display mode. As illustrated in FIG. 3, on edges of a pixel electrode, liquid crystal molecules are driven by a fringe electric field; a component of a horizontal electric field is large, electric field intensity is strong, and a plurality of liquid crystal molecules rotate, so the transmittance is higher; but in positions that are away from the fringe electric field and where a vertical electric field is mainly distributed, electric field intensity is lower, so liquid crystal molecules cannot be rotated sufficiently, causing the transmittance to be lower.

Besides, in the pixel structures of the conventional ADS display mode, a storage capacitor Cst is generated in overlapping sections between the pixel electrode 4 and the common electrode 6, making the load applied on a display panel larger, the coupling between a data signal and a common electrode signal is increased accordingly, and the common electrode signal is pulled up by the data signal. The distortion of the common electrode signal affects the normal charge-discharge of the pixel, thereby causing greenish phenomenon and affecting picture display of the liquid crystal display panel.

SUMMARY

An embodiment of the invention provides a liquid crystal display panel, comprising a color filter substrate and an array substrate; pixel electrodes, common electrodes, and an insulator layer that separates the pixel electrodes and the common electrodes are provided on the array substrate; a plurality of a first protruding structures in an upward protruding direction and a plurality of a second protruding structures in a downward protruding direction are provided inside the insulator layer; the first protruding structures and the second protruding structures are disposed alternately; and the pixel electrodes and the common electrodes are respectively formed on the first protruding structures and the second protruding structures.

Another embodiment of the invention provides a display device, comprising the above liquid crystal display panel.

A further embodiment of the invention provides an electric apparatus, comprising the above display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Figure 1:
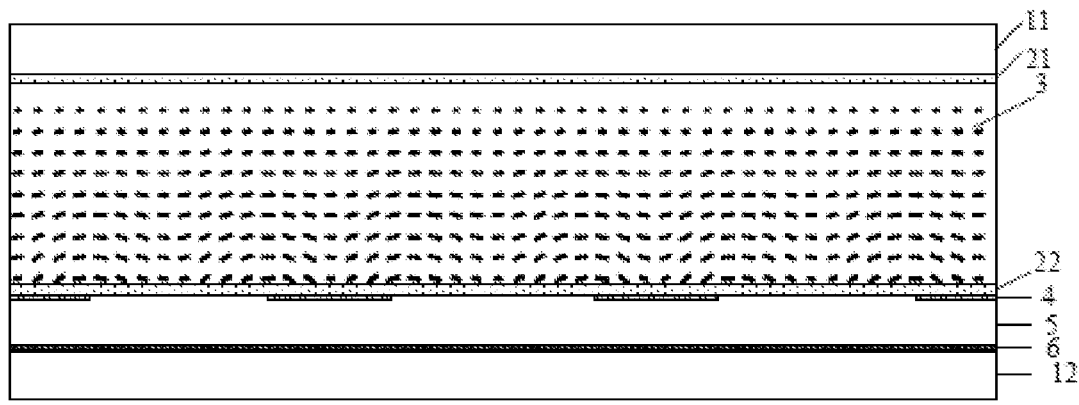
FIG. 1 is a cross-sectional view schematically illustrating a pixel structure of a conventional ADS display mode.

Reference numerals:

| 11, 12: substrate | 21, 22: alignment layer |
| 3: liquid crystal | 4: pixel electrode |
| 5: insulator layer | 6: common electrode |

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

With regard to the problem that a liquid crystal display panel of the conventional ADS display mode has lower transmittance and suffers greenish phenomenon, affecting picture display of the liquid crystal display panel, embodiments of the invention provide a liquid crystal display panel, a display device and an electric apparatus, which can increase the transmittance of the liquid crystal display panel and improve picture display quality of the liquid crystal display panel.

An embodiment of the invention provides a liquid crystal display panel, comprising a color filter substrate and an array substrate; pixel electrodes, common electrodes, and an insulator layer that separates the pixel electrodes and the common electrodes are provided on the array substrate; a plurality of a first protruding structures in an upward protruding direction and a plurality of a second protruding structures in a downward protruding direction are provided inside the insulator layer; the first protruding structures and the second protruding structures are disposed alternately; and the pixel electrodes and the common electrodes are respectively formed on the first protruding structures and the second protruding structures.

In some embodiments of the invention, bottom surfaces of the first protruding structures and apexes or top surfaces of the second protruding structures are in the same horizontal plane, and bottom surfaces of the second protruding structures and apexes or top surfaces of the first protruding structures are in the same horizontal plane.

In liquid crystal display panels of the embodiments of the invention, the pixel electrodes and the common electrodes are disposed alternately, so electric field strength of a fringe electric field can be strengthened; further, the pixel electrodes and the common electrodes are formed on the protruding structures, and an interval between a pixel electrode and a common electrode can be provided smaller, so the specific area of the pixel electrodes and the common electrodes is increased, making electric field intensity between the electrodes strengthened, the transmittance of the liquid crystal display panels is increased accordingly, and the power consumption of the display panels can be reduced; furthermore, the common electrodes and the pixel electrodes are disposed alternately, making overlapping areas between the electrodes become small, and the capacitance value of the storage capacitor Cst also become small, thus improving picture display quality of the liquid crystal display panels.

In the liquid crystal display panel of an embodiment of the invention, the protruding structures can be in the shape of triangle, semiellipse, trapezoid, parallelogram or semicircle, but the embodiments of the invention are not limited thereto. For example, in some embodiments of the invention, the protruding structures are in the shape of triangle, trapezoid or parallelogram.

In an embodiment of the invention, for example, when the first protruding structures are in the shape of triangle, the second protruding structures can be in the shape of triangle, parallelogram or trapezoid; or, when the second protruding structures are in the shape of triangle, the first protruding structures can be in the shape of triangle, parallelogram or trapezoid.

In some embodiments of the invention, for example, the first protruding structures can be in the shape of isosceles triangle, and in this case, the second protruding structures can be in the shape of isosceles triangle or isosceles trapezoid. When the second protruding structures are in the shape of isosceles trapezoid, the acute angles of the isosceles trapezoid are the same as the base angles of the isosceles triangle of the first protruding structures; when the second protruding structures are in the shape of isosceles triangle, the base angles of the isosceles triangle are the same as the base angles of the isosceles triangle of the first protruding structures, and in this way, the sides of the pixel electrodes can be parallel to that of the adjacent common electrodes to strengthen electric field strength of the fringe electric field, and then to increase the transmittance of the liquid crystal display panels and to reduce the power consumption of the display panels.

In some embodiments of the invention, for example, the first protruding structures can be in the shape of isosceles trapezoid, and in this case, the second protruding structures can be in the shape of isosceles triangle or isosceles trapezoid. When the second protruding structures are in the shape of isosceles trapezoid, the acute angles of the isosceles trapezoid of the first protruding structures are the same as the acute angles of the isosceles trapezoid of the second protruding structures; when the second protruding structures are in the shape of isosceles triangle, the base angles of the isosceles triangle are the same as the acute angles of the isosceles trapezoid of the first protruding structure, and in this way, the sides of the pixel electrodes can be parallel to that of the adjacent common electrodes to strengthen the electric field strength, and then to increase the transmittance of the liquid crystal display panels and reduce the power consumption of the display panels.

In an embodiment of the invention, the acute angles of the above isosceles trapezoid are 30°~60°, for example, and the base angles of the above isosceles triangle are 30°~60°, for example, and in this way, the electric field intensity between the electrodes and the electric field strength of the fringe electric field can be guaranteed.

In the liquid crystal display panels of the embodiments of the invention, the pixel electrodes and the common electrodes are disposed alternately, so the interval between a pixel electrode and a common electrode can be designed as small as possible without affecting display. In this case, the specific area of the pixel electrodes and the common electrodes can be further increased, making the electric field intensity between the electrodes strengthened, and then the transmittance of the liquid crystal display panels is increased.

Further, the pixel electrodes and the common electrodes are disposed alternately, making the overlapping areas of the pixel electrodes and the common electrodes in the vertical plane become small or not exist. In this way, the capacitance value of the storage capacitor Cst can be reduced, and then the picture display quality of the liquid crystal display panels is improved.

With reference to the accompanying drawings, detailed description of the liquid crystal display panels of the embodiments of the invention is in the following.

It is well known that the ADS display technology involves the fringe electric field switching technology, drives liquid crystal molecules better in the vicinity of the fringe electric field, and has high transmittance, because the used positive liquid crystal molecules, in a driving state, are in parallel to the direction of the electric field, and the birefraction property of liquid crystal can make polarized light split effectively and pass through the panel. The component of a horizontal electric field is large in the vicinity of the fringe electric field, so it is very easy for the polarized light to achieve the optimal transmittance of the display panel by horizontal rotations of liquid crystal molecules; but the vertical electric field is mainly distributed in positions away from the fringe electric field, thus leading to low transmittance of the display panel.

Figure 2:
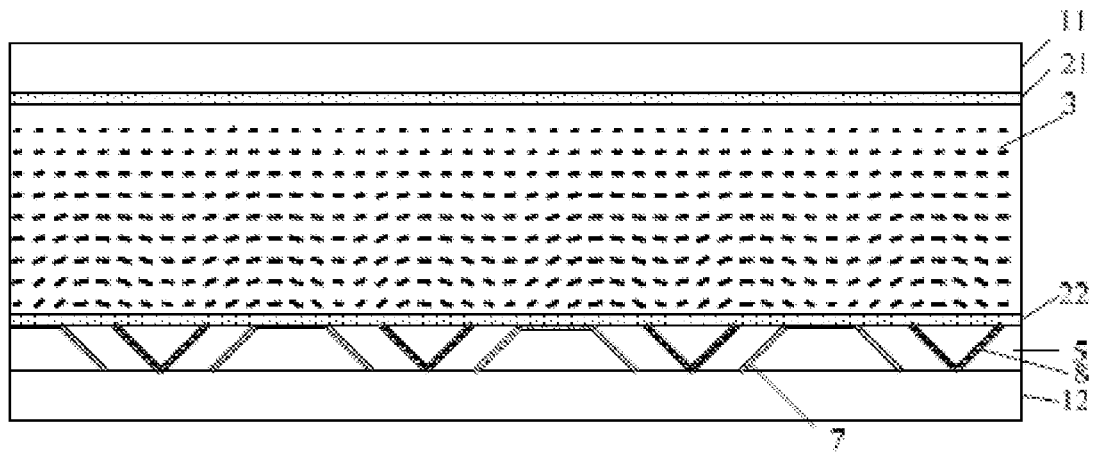
FIG. 2 is a cross-sectional view schematically illustrating a pixel structure of an embodiment of the invention.

An embodiment of the invention provides a liquid crystal display panel, comprising a structure that is different from the conventional pixel electrodes and common electrodes. As illustrated in FIG. 2, the liquid crystal display panel of the embodiment of the invention can include a lower substrate 12, an insulator layer 5 formed on the lower substrate 12, a lower alignment layer 22 formed on the insulator layer 5, an upper substrate 11, an upper alignment layer 21 formed on the upper substrate 11, and liquid crystal provided between the upper alignment layer 21 and the lower alignment layer 22. Further, pixel electrodes 7 and common electrodes 8 are formed in the insulator layer 5, and the pixel electrodes 7 and the common electrodes 8 are disposed alternately; the pixel electrodes 7 are in the shape of isosceles trapezoid, and the common electrodes 8 are in the shape of isosceles triangle; the acute angles of the isosceles trapezoid are the same as the base angles of the isosceles triangle. In the embodiment of the invention, the sides of the pixel electrodes 7 are in parallel to that of the adjacent common electrodes 8.

In the embodiment of the invention, the common electrodes and the pixel electrodes are disposed alternately, so that more effective transverse electric fields can be formed between the pixel electrodes and the common electrodes on the substrate, and it is easier for liquid crystal molecules to rotate transversely. Thereby, it can be achieved that liquid crystal molecules are rotated rapidly under a lower driving voltage. For this reason, light transmittance of the liquid crystal display panel can be improved, driving voltage can be reduced and response time can be decreased. Further, overlapping regions between the pixel electrodes and the common electrodes are reduced, so the capacitance value of the storage capacitor Cst is decreased effectively, and then the greenish phenomenon is eliminated effectively.

Figure 3:
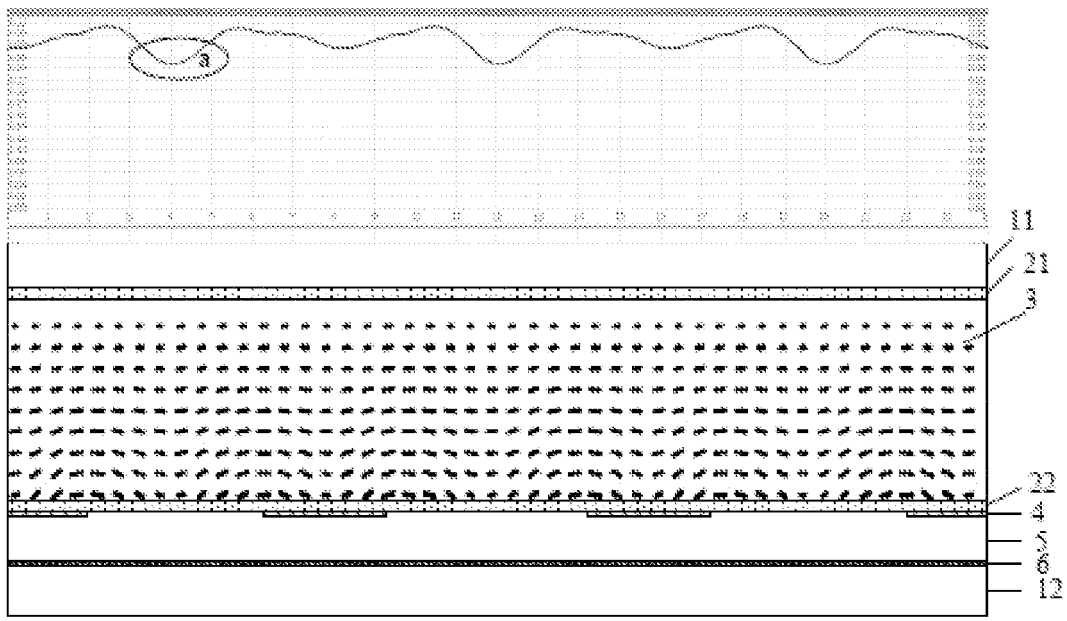
FIG. 3 is a diagram schematically illustrating the transmittance of a pixel structure of the conventional ADS display mode.
Figure 4:
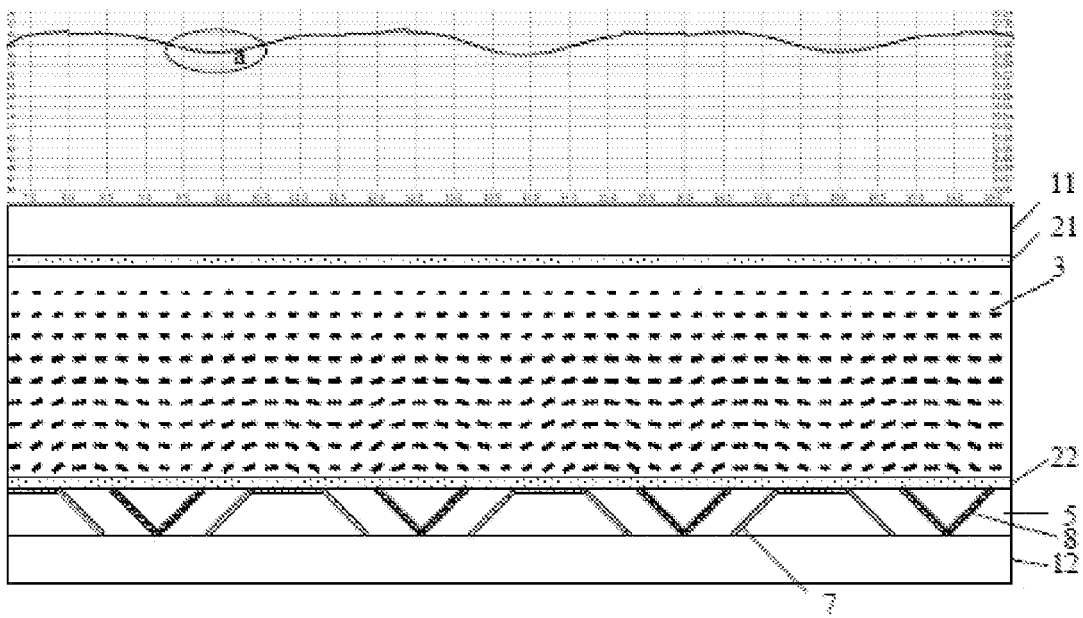
FIG. 4 is a diagram schematically illustrating the transmittance of a pixel structure of the embodiment of the invention.

Simulation analysis for light transmittance and power consumption of the liquid crystal display panel of the embodiment of the invention can be conducted by means of software. FIG. 3 is a diagram schematically illustrating the transmittance of a pixel structure of the conventional ADS display mode, and in FIG. 3, cross-sectional views showing transmittance with respect to respective positions are simulated. As illustrated in FIG. 3, transmittance is higher at edges of the pixel electrodes, but lower in positions that are away from the fringe electric field. FIG. 4 is a diagram schematically illustrating the transmittance of a pixel structure of the embodiment of the invention, and in FIG. 4, cross-sectional views showing transmittance with respect to respective positions are simulated. Simulation conditions of a pixel structure in the embodiment of the invention can be the same as that in the conventional ADS display mode. In other words, simulation conditions of FIG. 3 are the same as that of FIG. 4. By comparing the same regions a (as indicated in FIG. 3 and FIG. 4), it can be seen that the fringe electric field of the pixel structure of the embodiment of the invention, as compared with that of the conventional ADS display mode, is increased, and then transmittance of the liquid crystal display panel is improved significantly.

Figure 5:
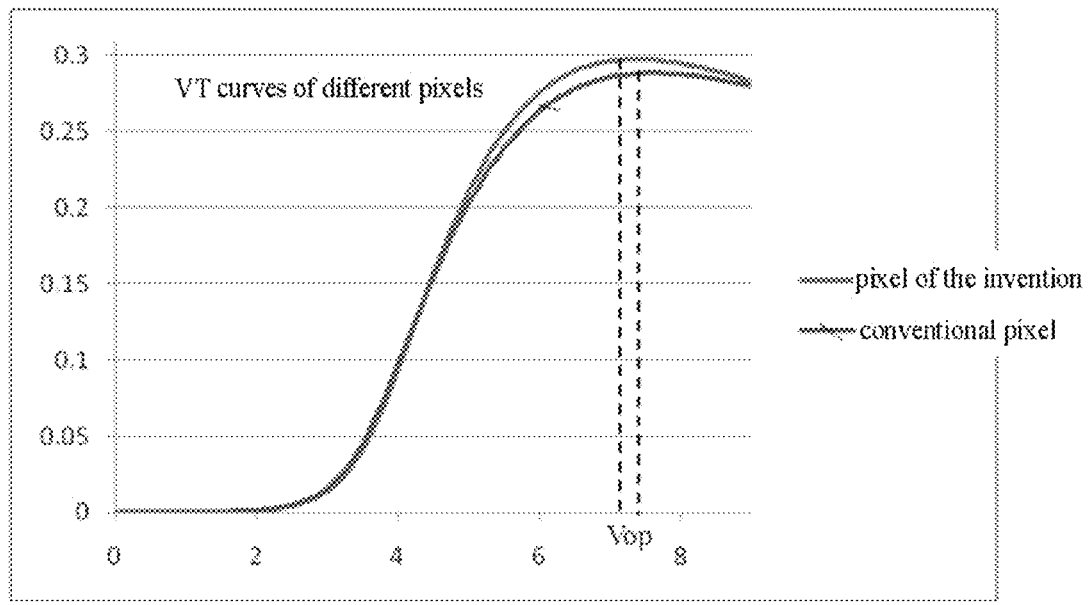
FIG. 5 is a diagram schematically illustrating a comparison between a VT curve of the pixel of the conventional ADS display mode and that of the embodiment of the invention.

Further, in order to understand light transmittance under different test voltages, a variation relationship between the voltage and the transmittance (Voltage-Transmittance, VT) is generally tested to obtain a VT curve. The method of obtaining the VT curve in a conventional technology is that: test voltages are applied to a data line, the transmittance under different test voltages are tested by a light transmittance test device, and then the VT curve is obtained. A VT curve of the pixel structure of the conventional ADS display mode and that of the embodiment of the invention are obtained, and the results are as illustrated in FIG. 5. By comparing the value of Vop, it can be known that the Vop of the pixel structure of the embodiment of the invention is smaller than that of the conventional ADS display mode; therefore, it can be further proved that technical solution of the embodiment of the invention can reduce the power consumption of the liquid crystal display panel.

Figure 6:
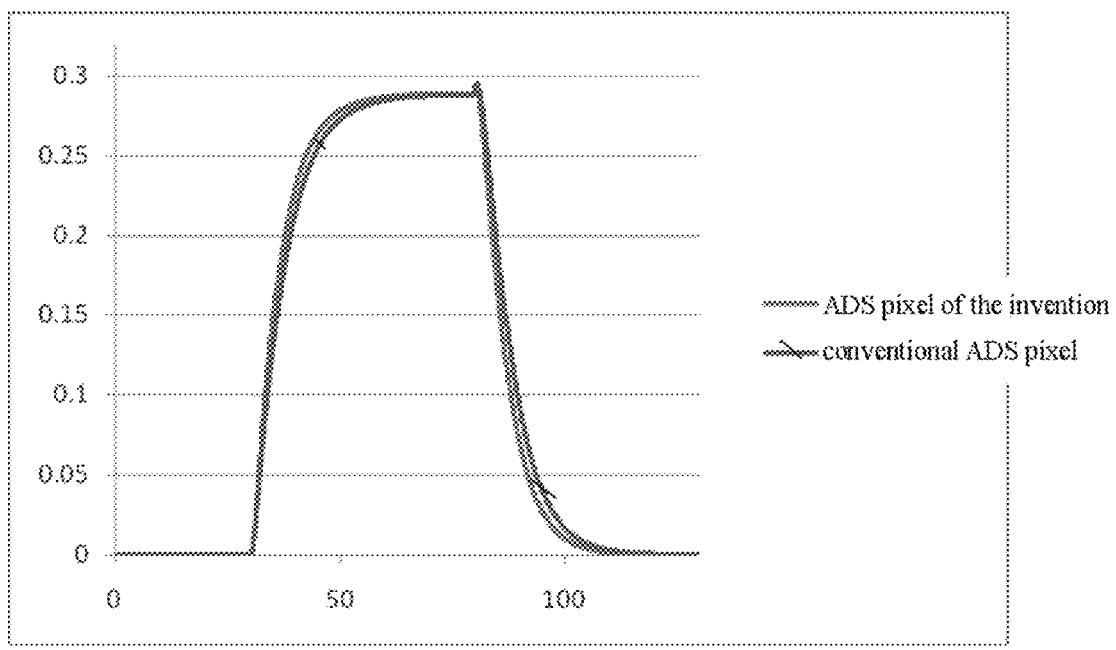
FIG. 6 is a diagram schematically illustrating a comparison between a transmittance-time curve of the pixel of the conventional ADS display mode and that of the embodiment of the invention.

Furthermore, a variation relationship between time and the transmittance can also be tested. A transmittance-time curve of the pixel structure of the conventional ADS display mode and that of the embodiment of the invention are obtained, and the results are as illustrated in FIG. 6. By comparing the response speed, it can be known that the response speed of the pixel structure of the embodiment of the invention is faster than that of the conventional ADS display mode; therefore, it can be further proved that technical solution of the embodiment of the invention can improve the response speed of the liquid crystal display panel.

In the liquid crystal display panels of the embodiments of the invention, the pixel electrodes and the common electrodes are disposed alternately, so electric field strength of the fringe electric field can be strengthened; further, the pixel electrodes and the common electrodes are formed on the protruding structures, and the interval between a pixel electrode and a common electrode can be provided smaller, so specific area of the pixel electrodes and the common electrodes is increased, making electric field intensity between the electrodes strengthened, the transmittance of the liquid crystal display panels increased accordingly, power consumption of the display panels can be reduced, and response speed of the liquid crystal display panels is improved; furthermore, the common electrodes and the pixel electrodes are disposed alternately, making overlapping areas between the electrodes become small, and capacitance value of the storage capacitor Cst also become small, thus improving picture display quality of the liquid crystal display panels.

An embodiment of the invention further provides a display device, comprising any one of the above liquid crystal display panels. The display device provided by the embodiment of the invention can be a product or a component that has any kind of display function, for example, a liquid crystal display panel, an electronic paper, a liquid crystal television, a liquid crystal display, a digital photo-frame, a cell phone, a tablet computer, and so on. But the embodiments of the invention are not limited thereto.

An embodiment of the invention further provides an electric apparatus, comprising any one of the above display devices.

The above embodiments are only used to illustrate the technical solutions of the invention rather than limitations; although the invention has been illustrated in detail with reference to the above embodiments, those skilled in the art should understand that the technical solutions recited in each of the above embodiments can be still modified, or part of the technical features can be varied equivalently; but these modifications or variations do not make the substance of the corresponding technical solutions go beyond of the spirit and scope of the technical solution of each embodiment of the invention.

The invention claimed is:

1. A liquid crystal display panel, comprising:
   a color filter substrate and an array substrate;
   pixel electrodes, common electrodes, and an insulator layer that separates the pixel electrodes and the common electrodes being provided on the array substrate;
   a plurality of first protruding structures in an upward protruding direction and a plurality of second protruding structures in a downward protruding direction being provided inside the insulator layer; the first protruding structures and the second protruding structures being disposed alternately along a same horizontal line, bottom surfaces of the first protruding structures and apexes or top surfaces of the second protruding structures being in a same first horizontal plane, and apexes or top surfaces of the first protruding structures and bottom surfaces of the second protruding structures being in a same second horizontal plane,
   wherein the pixel electrodes and the common electrodes are respectively formed on the first protruding structures and the second protruding structures.

2. The liquid crystal display panel as claimed in claim 1, wherein the first protruding structures and the second protruding structures are in a shape of triangle, semiellipse, trapezoid, parallelogram or semicircle.

3. The liquid crystal display panel as claimed in claim 2, wherein the first protruding structures are in a shape of isosceles trapezoid, the second protruding structures are in a shape of isosceles triangle, and acute angles of the isosceles trapezoid are equal to base angles of the isosceles triangle; or the second protruding structures are in a shape of isosceles trapezoid, the first protruding structures are in a shape of isosceles triangle, and acute angles of the isosceles trapezoid are equal to base angles of the isosceles triangle.

4. The liquid crystal display panel as claimed in claim 2, wherein the first protruding structures are in a shape of isosceles trapezoid, the second protruding structures are in a shape of isosceles trapezoid, and acute angles of the two isosceles trapezoids are equal to each other.

5. The liquid crystal display panel as claimed in claim 4, wherein the acute angles of the isosceles trapezoids are 30°~60°.

6. The liquid crystal display panel as claimed in claim 2, wherein the first protruding structures are in a shape of isosceles triangle, the second protruding structures are in a shape of isosceles triangle, and base angles of the two isosceles triangles are equal.

7. The liquid crystal display panel as claimed in claim 6, wherein the base angles of the isosceles triangles are 30°~60°.

8. A display device, comprising the liquid crystal display panel as claimed in claim 1.

9. An electric apparatus, comprising the display device as claimed in claim 8.

10. The display device as claimed in claim 8, wherein bottom surfaces of the first protruding structures and apexes or top surfaces of the second protruding structures are in a same first horizontal plane, and bottom surfaces of the second protruding structures and apexes or top surfaces of the first protruding structures are in a same second horizontal plane.

11. The display device as claimed in claim 10, wherein the first protruding structures and the second protruding structures are in a shape of triangle, semiellipse, trapezoid, parallelogram or semicircle.

12. The display device as claimed in claim 11, wherein the first protruding structures are in a shape of isosceles trapezoid, the second protruding structures are in a shape of isosceles triangle, and acute angles of the isosceles trapezoid are equal to base angles of the isosceles triangle; or the second protruding structures are in a shape of isosceles trapezoid, the first protruding structures are in a shape of isosceles triangle, and acute angles of the isosceles trapezoid are equal to base angles of the isosceles triangle.

13. The display device as claimed in claim 11, wherein the first protruding structures are in a shape of isosceles trapezoid, the second protruding structures are in a shape of isosceles trapezoid, and acute angles of the two isosceles trapezoids are equal to each other.

14. The display device as claimed in claim 13, wherein the acute angles of the isosceles trapezoids are 30°~60°.

15. The display device as claimed in claim 11, wherein the first protruding structures are in a shape of isosceles triangle, the second protruding structures are in a shape of isosceles triangle, and base angles of the two isosceles triangles are equal.

16. The display device as claimed in claim 15, wherein the base angles of the isosceles triangles are 30°~60°.

17. The display device as claimed in claim 8, wherein the liquid crystal display panel is of Advanced Super Dimension Switch type.

18. The liquid crystal display panel as claimed in claim 1, wherein the liquid crystal display panel is of Advanced Super Dimension Switch type.

\* \* \* \* \*